US005650934A

United States Patent [19]

Manduley

[11] Patent Number: 5,650,934

[45] Date of Patent: Jul. 22, 1997

[54] SYSTEM FOR PREPARING AND FRANKING A MAIL PIECE

[75] Inventor: Flavio M. Manduley, Woodbury, Conn.

[73] Assignee: Pitney Bowes Inc., Stamford, Conn.

[21] Appl. No.: 453,317

[22] Filed: May 31, 1995

[51] Int. Cl.$^{6}$ .................... G06F 17/00

[52] U.S. Cl. .................... 364/478.08; 364/464.17

[58] Field of Search .................... 364/464.02, 464.03, 364/401 R, 478.07–478.09, 478.15, 466; 270/1.02, 1.03, 58.06; 209/900; 235/375

[56] References Cited

U.S. PATENT DOCUMENTS

| | | | |
|---|---|---|---|
| 3,606,728 | 9/1971 | Sather et al. . | |
| 3,692,988 | 9/1972 | Dlugos et al. . | |
| 4,308,579 | 12/1981 | Dlugos et al. . | |
| 4,639,873 | 1/1987 | Baggarly et al. . | |
| 4,797,830 | 1/1989 | Baggarly et al. | 364/464.03 |
| 4,800,506 | 1/1989 | Axelrod et al. | 364/464.02 |
| 4,809,187 | 2/1989 | Adams | 364/464.03 |
| 4,829,443 | 5/1989 | Pintsov et al. | 364/464.03 |
| 5,142,482 | 8/1992 | Sansone | 364/478.09 |

*Primary Examiner*—Reba I. Elmore
*Assistant Examiner*—Steven R. Garland
*Attorney, Agent, or Firm*—Ronald Reichman; Robert H. Whisker; Melvin J. Scolnick

[57] ABSTRACT

An apparatus and method for producing mail pieces. The apparatus includes a first printer for printing documents and a second printer for printing envelopes and a mail finishing unit for receiving the printed documents from the first printer and the envelopes printed with corresponding addresses from the second printer and inserting the documents into the envelope to form and frank a mail piece. The apparatus operates under the control of a single stream of job data from a host computer, where the job data includes a job header defining default mail piece attributes and mail piece records which include document data and address data, and which may include specific mail piece attribute data for each corresponding mail piece. The apparatus control mechanism partitions the data stream and controls the first printer to print the documents while controlling the second printer to separately print the envelopes which are moved along a separate path to an insert station where the mail piece is formed. The apparatus also includes data stores of postal rates and of per item rating characteristics of items of materials used to form mail pieces.

18 Claims, 9 Drawing Sheets

SYSTEM FOR PREPARING AND FRANKING A MAIL PIECE

BACKGROUND OF THE INVENTION

The subject invention relates to a system for producing and franking a mail piece. More particularly, it relates to a system for producing mail pieces which system is suitable for use with microcomputers and standard word processing software in an office environment.

Many systems for producing mail pieces directly from the printed output of a data processing system have been proposed in the past. For example, U.S. Pat. No. 5,283,752; to Gombault et al.; issued Feb. 1, 1994 discloses a mail preparation system wherein a data processing system controls a linear mail preparation apparatus. The data processing system controls a printer to print documents which, after printing, pass, under the control of the data processing system, through a succession of stations such as a burster, an insert feed station, an address printer, a postage meter and the like.

Similarly, U.S. Pat. No. 4,800,505; to: Axelrod et al; issued Jan. 24, 1989, discloses a system wherein a data processing system prints documents and marks them with an identification code, and simultaneously downloads parameters for controlling the operation of a mail preparation line to a database. As the documents are fed into the mail preparation line, the identification code is scanned and used to access the database to determine the parameters for each mail piece to be produced from the corresponding documents.

Other systems for inserting documents into windowed envelopes so that an address printed on the document is visible, or system for printing self-mailer forms which are then folded and sealed to form mail pieces are also known.

A system where an envelope form is printed in sequence with documents and later accumulated with the documents, then wrapped around the documents and sealed to form the mail piece is described in U.S. Pat. No. 5,067,305; issued Nov. 26, 1991; to Baker et al.

U.S. Pat. No. 4,797,830; to: Baggarly et al. describes an inserter system which has a capability to compute postage for a mail piece based upon predetermined weights for inserts included in the mail piece.

While such systems are perhaps suitable for their intended purpose heretofore no system has been available to mailers of moderate size (i.e. who mail on the order of a few thousand pieces a month), who wish to produce high quality mail runs. Systems such as that taught by Gombault et al., Baggarly et al. and Axelrod et al. are intended for large scale mailers using main frame computers and high capacity inserter systems, while windowed envelopes and self-mailers have an unfortunate "junk mail" aspect.

Accordingly, it is an object of the subject invention to provide a system for producing and franking moderately sized mail runs of a high quality, and which is suitable for use in an office environment with standard microcomputers and word processing programs.

BRIEF SUMMARY OF THE INVENTION

The above object is achieved and the disadvantages of the prior art are overcome in accordance with the subject invention by means of a system and apparatus for producing a mail piece, wherein the apparatus includes a first printer for printing a document and a mail finishing unit for receiving the document from the first printer and combining the document with an envelope to form a mail piece. The mail finishing unit includes a mechanism for franking the mail piece. The apparatus also includes a controller which is responsive to mail piece data; the mail piece data including first data for defining the document and second data for defining the address to be printed on the document and postal data defining a class of postal service and any special services for the mail piece and, optionally, a weight for the mail piece. The controller controls the first printer to print documents in accordance with the document data, and accesses a data base of postage rates to determine a postage amount for the mail piece and controls the franking mechanism to frank the mail piece with that amount.

Preferably, the controller also includes a capability to access a second data base of per item weights to calculate a weight for the mail piece if the weight is not included in the mail piece data.

The system of the subject invention also includes data processing apparatus for:

- generating document data descriptive of a document in the mail piece;
- appending attribute data to the document data to form mail piece data descriptive of the mail piece; and,
- transmitting a digital signal representative of the mail piece data to the apparatus.

In accordance with one aspect of the subject invention the document data includes graphic data representative of an image of the document.

In accordance with another aspect of the subject invention the apparatus includes a second printer which both prints an address on the mail piece envelope and prints a franking indicia on the envelope.

In accordance with another aspect of the subject invention the apparatus communicates with a class 2 postage meter which returns at least a variable portion of the indicia to be printed by the second printer.

In accordance with yet another aspect of the subject invention the mail piece is printed with a scannable representation of the postage amount.

In accordance with still another aspect of the subject invention the franking mechanism includes a substantially conventional postage meter.

Other advantages and objects of the invention will be apparent to those skilled in the art from consideration of the attached drawings and of the detailed description set forth below.

BRIEF DESCRIPTION OF THE DRAWINGS

Various preferred embodiments of the subject invention are shown in the attached drawings, wherein substantially similar elements common to different embodiments are numbered the same.

DETAILED DESCRIPTION OF PREFERRED EMBODIMENTS OF THE SUBJECT INVENTION

Figure 1:
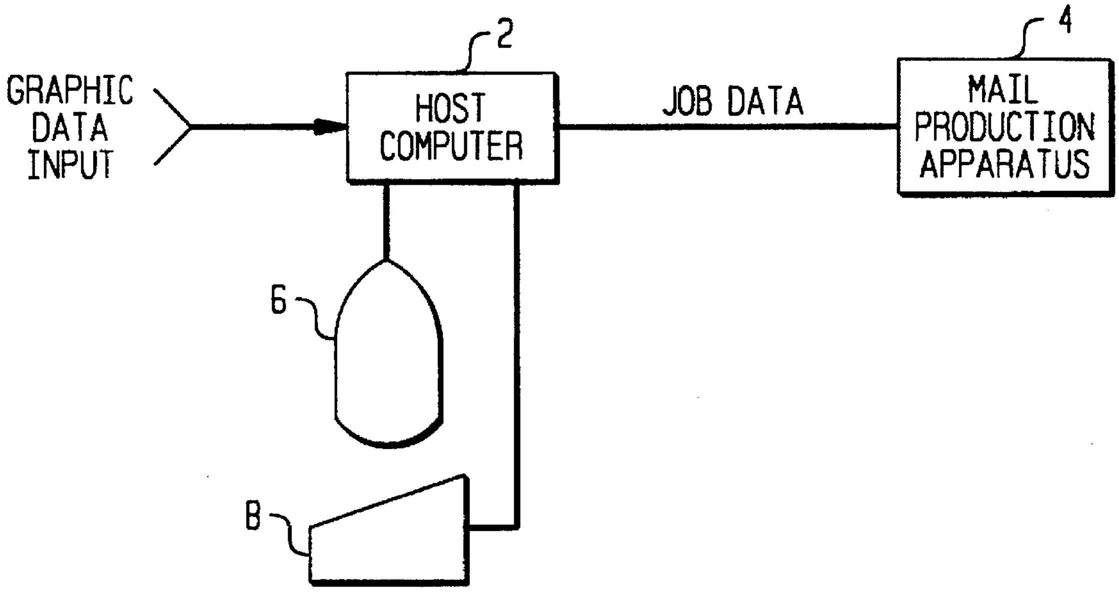
FIG. 1 is a schematic block diagram of a system in accordance with the subject invention.

FIG. 1 shows a system in accordance with the subject invention which includes host computer 2 which communicates with mail production apparatus 4. The system of FIG. 1 also includes conventional display 6 and keyboard 8 through which an operator inputs document data descriptive of a documents to be included in mail pieces and other information defining various attributes of the mail pieces. The system also includes an input for input of graphical data representative of a graphic images of the documents from sources such as facsimile transmitters or document scanners (not shown).

Figure 2:
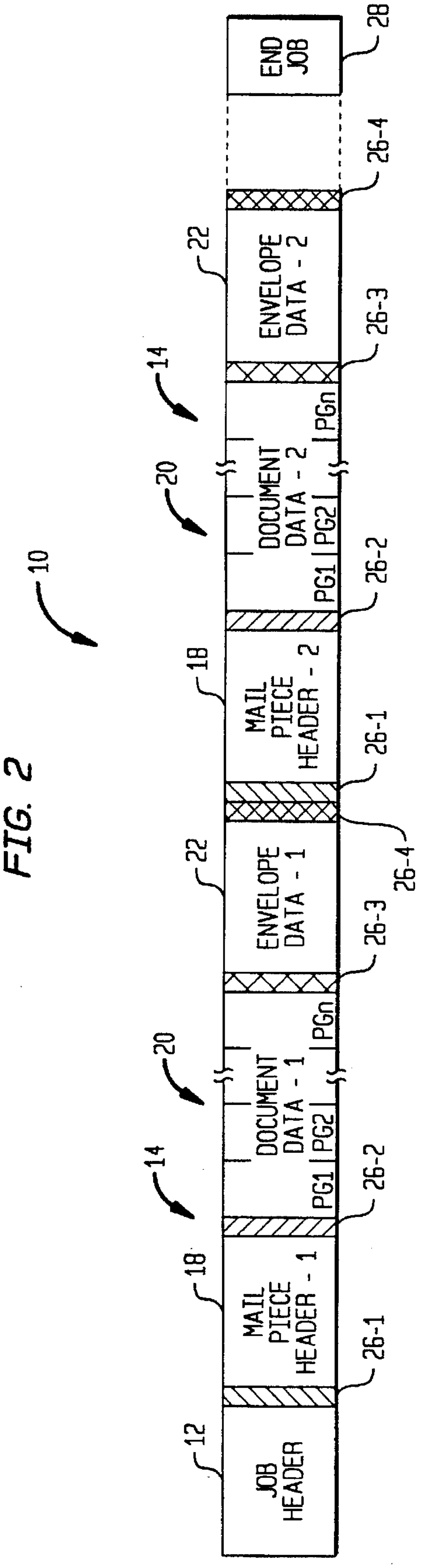
FIG. 2 is a schematic representation of job data defining a mailing job.

In FIG. 2 a schematic representation of job data 10 for controlling an apparatus in accordance with the subject invention to produce a mailing job, i.e. a sequence of mail pieces, is shown. Job data 10 includes job header 12 and a sequence of mail piece records 14, each of records 14 including mail piece data corresponding to a mail piece to be produced in the job. Job header 12 includes mail piece data defining default attributes for each mail piece in the job; including the number of document sheets to be accumulated for each mail piece, whether or not a pre-printed insert is to be added to the document sheets, the manner in which the accumulated sheets are to be folded, whether or not a BRE (i.e. business return envelope) is to be inserted into the envelope with the folded accumulation, and whether or not the mail piece is to be moistened and sealed.

Preferably job header 12 also defines a job type: whether not envelope data is present (i.e. if a window envelope is to be used), whether all mail pieces include a uniform number of document sheets, and whether or not inserts vary among the mail pieces; as well as an optional job name to be displayed while the job runs. Job type data allows the system to anticipate simpler jobs (e.g. there is no need to execute code associated with envelope printing if the job type defines a window envelope) and confirms that the absence of unneeded attribute data is not an error. It is also within the contemplation of the subject invention that, for completely uniform jobs a format which did not include mail piece header 18 could be used. Of course if such a system were intended to process both uniform and non-uniform jobs, job header 12 would specify if mail piece headers 18 were included.

Each of records 14 corresponds to one mail piece to be produced, and includes mail piece header 18, document data field 20, and envelope data field 22. Mail piece header 18 includes the same (or a subset of the) mail piece data elements included in job header 12 to define the mail piece attributes specific to the corresponding mail piece.

Document data 20 is mail piece data defining a sequence of document pages to be printed by the document printer as will be described below. It is a particular advantage of the subject invention that document data 20 can be completely compatible with standard laser printers and the output of standard word processing programs and described in a conventional page description language such as the Hewlett Packard PCL5 language, or equivalent. Envelope data field 22 includes an address to be printed on the envelope. Preferably this address will be extracted from document data by the host computer in any convenient manner such as the identification of address fields in the document data, as will be described further below.

Fields 18, 20 and 22 are separated by unique separators 26-1, 26-2, 26-3 and 26-4 and data 10 also includes an End of Job marker 28 to identify the end of the job.

In accordance with an embodiment of the subject invention, either or both of the document data and the envelope data can be graphic data directly representative of an image of all or part of a document or an envelope, as will be described further below.

Figure 3:
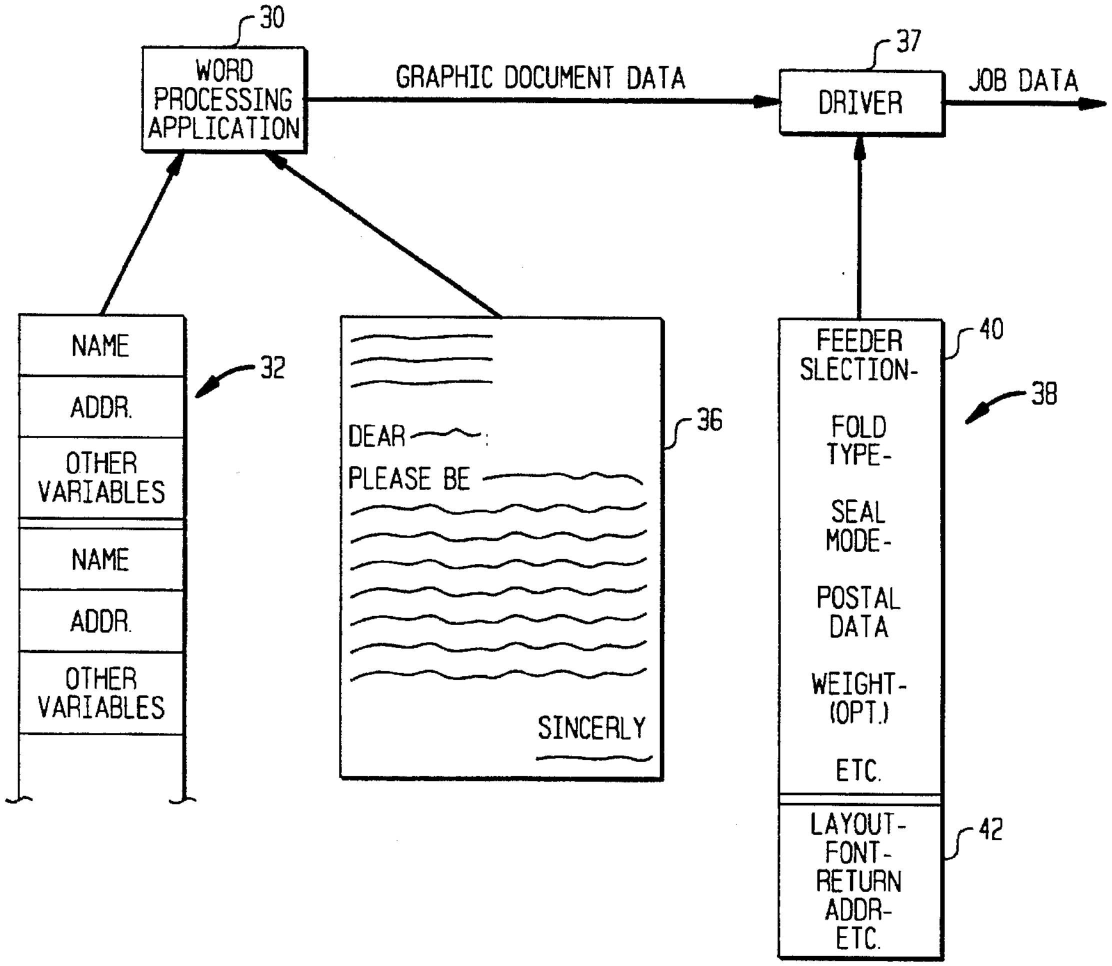
FIG. 3 is a schematic representation of the data flow in a host computer in producing the job data of FIG. 1 with text input.

FIG. 3 shows the data flow in host computer 2, which is preferably a microcomputer of the type commonly used in an office environment, in creating job data 10 in text form. A commercial word processing program, such as that sold under the trade name "Word" by the Microsoft Corporation, executes a conventional merge application to merge variable data 32, which includes name, address and other variables to be printed on the documents with a previously input form 36 to create document data. The document data is input to driver 37 and driver 37 creates the job data by extracting an address from the document data and accessing data store 38 to define the mail piece attributes, previously defined by the system operator.

Driver 37 extracts the address from the document data in any convenient conventional manner, such as by the use of a predetermined field within the document data, or the use of an algorithm based upon the detection of alphanumeric combinations typical of zip codes, state names, city names, etc., as is also known. Driver 37 also accesses data store 38 to obtain the attribute information which includes processing attributes 40, such as feeder selection, fold type, sealing mode etc., which control operation of apparatus 4 to produce the mail piece in the desired form, as will be described further below. Data store 38 also includes postal attributes for the mail piece; such as the class of postal service to be used, any applicable discounts, or any special services (e.g. special delivery) required. Data store 38 can also include the mail piece weight if it is known.

Preferably driver 37 also gets job type data 42 from data store 38 for inclusion in job header 12. Driver 7 then adds separators 26-1 through 26-4 to create header 12 and records 14, as described above. It is well within the skill of a person of ordinary skill in the programming arts to modify a word processing application or produce a special application which would enable a system operator to input such varying attribute data for mail piece headers 18, and details of such applications need not be described for an understanding of the subject invention.

Figure 4:
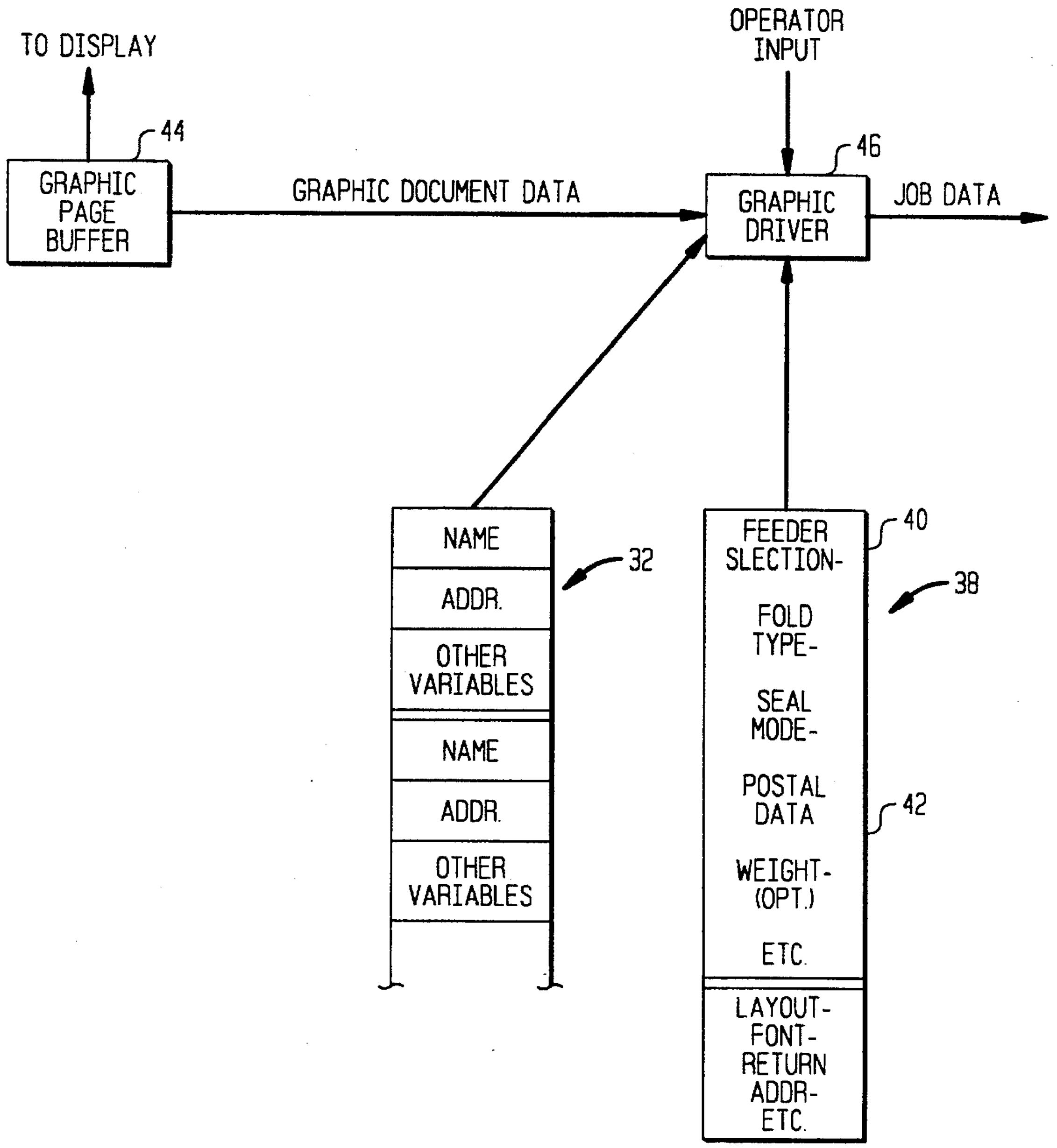
FIG. 4 is a schematic representation of the data flow in a host computer in producing the job data of FIG. 1 with graphic input.

FIG. 4 shows the data flow in host computer 2 in creating job data in graphic or mixed graphic and text form. Graphic data directly representative of images of documents to be included in mail pieces is input to and stored in graphic page buffer 44. Graphic document data is input to graphic driver 46 which creates the job data. Graphic driver 46 accesses data store 38 to define the mail piece attributes. Graphic driver 46 also assesses variable data 32 to determine names and addresses for the mail pieces. If the graphic document data is complete variable data 32 is only needed to define the envelope data for the mail pieces; however, names, addresses and other variables can be inserted in fields in the graphic document data, either in predefined fields or in fields designated by a system operator who examines the graphic document data on display 6.

Preferably, in embodiments where apparatus 4 includes a printer which has a capability to print mixed graphic and text data the job data is transmitted with variable data 32 in text form; however in other embodiments graphic driver 46 can convert variable data 32 into graphic form before merging it using conventional character generation technology.

As with driver 37, the various features of graphic driver 46 are known and the programming of such a driver would be well within the capabilities of a person skilled in the art.

Figure 5:
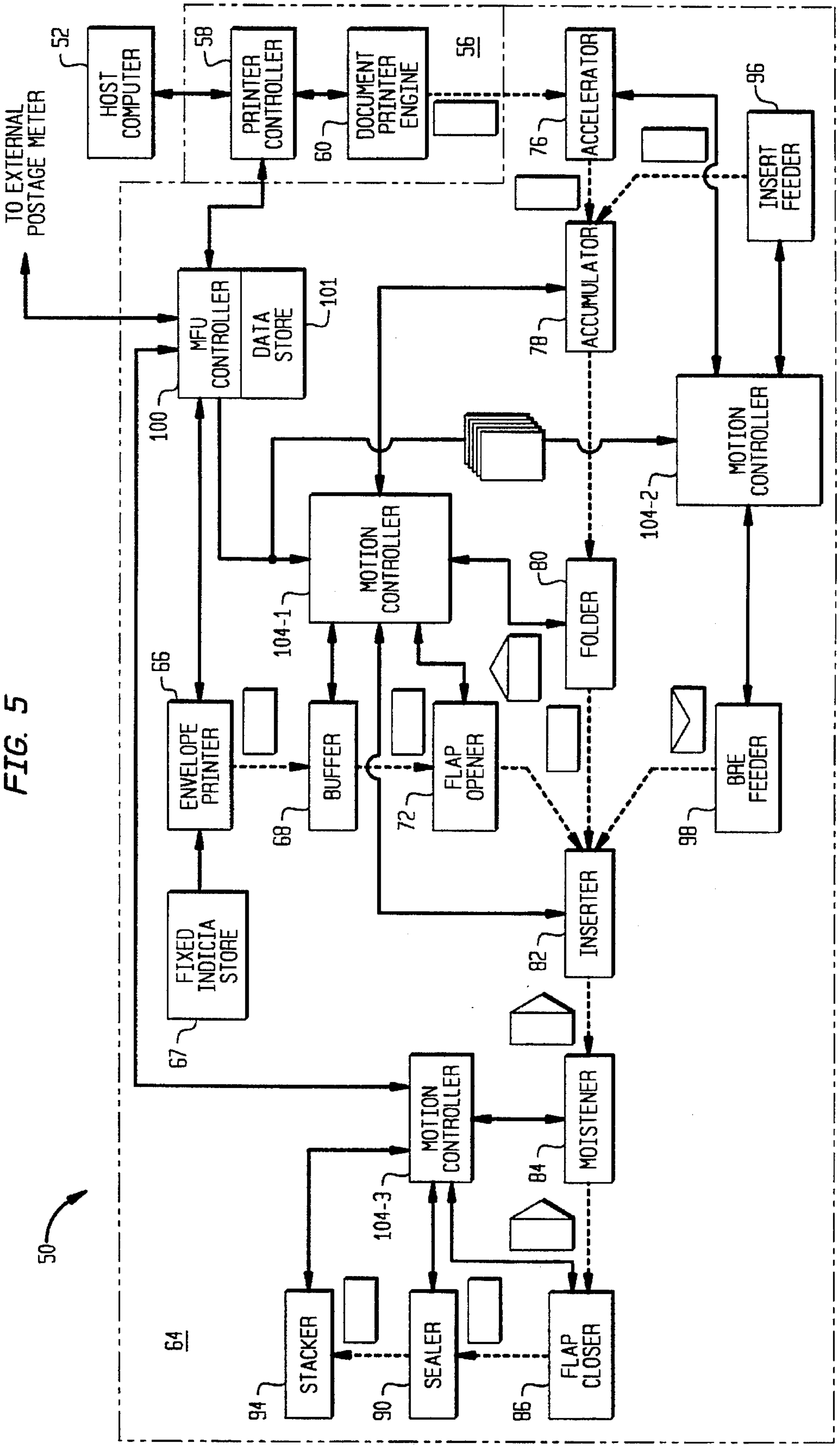
FIG. 5 is a schematic block diagram of the flow of mail production apparatus used in one embodiment of the system of FIG. 1.

Turning to FIG. 5, apparatus 4 is connected to host computer 2 to receive job data 10 as an electronic digital signal which is generated as described above. Apparatus 4 includes document printer 56, which is preferably a laser printer including printer controller 58 and a conventional document printer engine 60, which is preferably a Canon model LBP-NX, and a mail finishing unit 64 which receives the printed documents from printer engine 60 and inserts them into envelopes to form mail pieces in accordance with the mail piece data, as will be described below. Note that it is a particular advantage of the subject invention that host computer 2 connects to document printer 56 in a manner which is substantially identical to the manner in which microcomputers connect to conventional laser printers, and which requires only the minor software modification to add address data and attribute data to the document data, which is produced by conventional word processing software or by conventional document scanning devices such as scanners or facsimile systems. (not shown)

Printer controller 58 receives job data 10 from host computer 2 and parses the data; sending the attribute data from either job header 12 or mail piece header 18 to mail finishing unit controller 100, and sending document data 20 to document printer engine 60, as will be described further below. Mail finishing unit controller 100 stores mail piece attributes 40 from job header 12 for default control of the production of each mail piece and downloads common elements of the address to be printed on the envelopes to envelope printer 66. Preferably envelope printer 66 includes an integral controller which will render the text characters received from mail finishing unit controller 100 into appropriate control signals to render an image of the address in accordance with the address data, the font, the layout etc.

Envelope printer 66 also stores the fixed portion of postal indicia to be printed on the envelope when the mail piece is to be franked in data store 67. When a mail piece is to be franked finishing unit controller 100 determines the weight of the mail piece and determines the appropriate postage value for the mail piece in a manner which will be described more fully below. Controller 100 then requests a postal indicia from a class 2 meter (not shown) which, assuming the request is granted, returns the variable portion of the indicia to controller 100. Controller 100 downloads this variable data to printer 66 together with address and other information to be printed on the envelope. Printer 66 then renders the full image to be printed on the envelope, combining the fixed portion of the indicia stored in data store 67 with the variable portion received from controller 100 to frank the mail piece.

(Class 2 meters are postage meters which dispense and account for pre-paid postage as do traditional postage meters but which use non-secure printers such as ink jet printers to print indicia. Where traditional, class 1, meters use rotary or flatbed print heads to print indicia which include complex, arbitrary images and special inks to protect against counterfeiting of indicia, class 2 meters incorporate encrypted information in the indicia to protect against counterfeiting while allowing use of non-secure printers, such as printer 66. Such meters are known in the art and a further description of their operation is not necessary for an understanding of the subject invention. Prestorage of fixed portions of indicia, as in the preferred embodiment described above, is described in, for example, published European patent application no.: 0,578,042 2A; filed Jun. 21, 1992; to: Stephan Gunther.)

Alternatively the postage amount may be down loaded to printer 66 for printing as a scannable representation such as a bar code or other form of representation which can easily be automatically scanned and recognized so that the mail piece can later be scanned and franked off line.

Envelope printer 66 is also preferably an ink jet printer and the printed envelopes are output from printer 66 to a drying buffer station 68 which extends the transport time of a succession of envelopes as they are output by envelope printer 66 to allow the printed address time to dry. Since a number of envelopes, preferably up to 6, are stored in buffer 68 printer controller 58 does not forward documents for printing to printer engine 60 until buffer 68 is loaded. That is, until drying buffer 68 is either filled to capacity or until an End of Job (EOJ) code is detected and the system knows that the last envelope is in buffer 68.

After the printed address has dried on the envelope the envelope proceeds to flap opener station 72 where the envelope flap is opened prior to insertion of the documents and possibly other items.

When drying buffer 68 is loaded printer controller 58 outputs a page of document data to document printer engine 60 which prints that page in a conventional manner. As the page is printed it is received by accelerator station 76, and as printer engine 60 releases the printed page accelerator station 76 accelerates the page to the faster speed at which mail finishing unit 64 operates.

Accelerator station 76 then transfers the printed page to accumulator station 78 and, if a plurality of pages are to be included in the mail piece the above described operations are repeated until all the document pages are in accumulator station 78. If the mail piece attributes specified for the mail piece include a preprinted insert such a preprinted insert may be fed from insert feeder 96 to accumulator station 78 since the higher operating speed of a mail finishing unit 64 will allow time for this without slowing the operation of document printer engine 60.

Once complete, the accumulation of printed document pages and any preprinted inserts are transferred from accumulator station 78 to folder station 80 where the accumulation is folded into either a "C" or "Z" fold as specified in the mail piece attributes. Once the folded accumulation is present at folder station 80 the envelope, with its flap open, is fed (or has been fed) to inserter station 82 and the folded accumulation is transferred from folder station 80 to inserter station 82 for insertion into the envelope. If specified by the mail piece attributes a BRE is fed from BRE feeder 98 and also inserted into the envelope.

The mail piece (i.e. the envelope with all printed documents and any preprinted inserts and BRE's inserted) is fed from inserter station 82 to moistener station 84 where the envelope flap is moistened if the mail piece is to be sealed. The mail piece then proceeds to flap closer station 86, sealer 90 and output stacker 94 where the completed mail piece, including all preprinted inserts and BRE's, with an address and possible return address printed on a conventional envelope, and which has been sealed if so specified, is output for delivery to the postal service.

The various stations described in mail finishing unit 64 perform functions which are well known in the mail preparation art and implementation of such stations would be well within the skill of those of ordinary skill in the mail preparation arts.

In a preferred embodiment of the subject invention drying buffer 68 is formed as an arrangement of four helical screws arranged to support an envelope and transport the envelope as the screws rotate, as described in commonly assigned, U.S. Pat. No. 5,429,349 filed May 2, 1994 and issued Jul. 4, 1995, which is hereby incorporated by reference.

Figure 6:
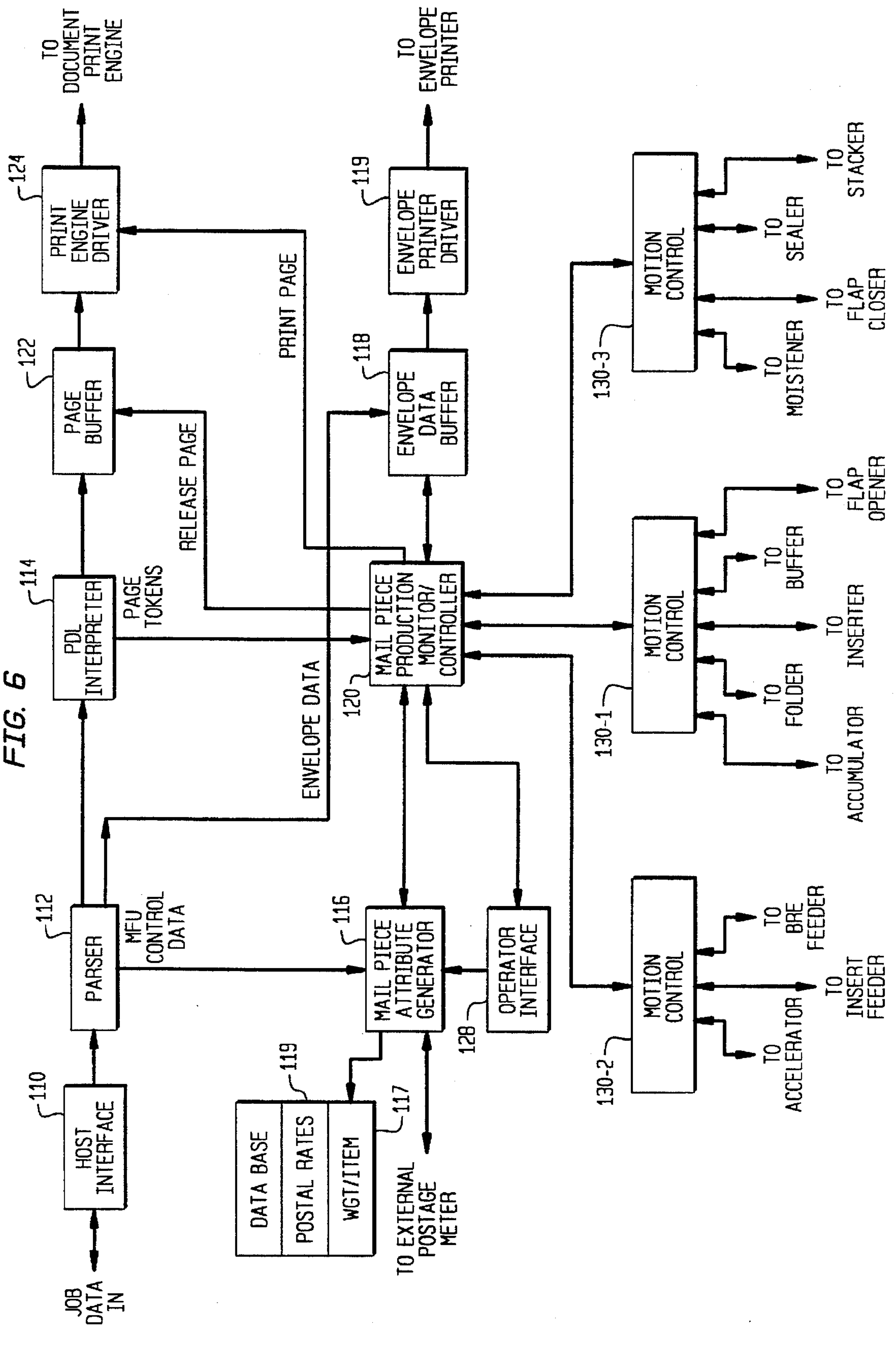
FIG. 6 is a schematic representation of the flow of control data in the apparatus FIG. 5.

Turning to FIG. 6 the operation of apparatus 4 is controlled in accordance with job data 10 by the execution of various software modules resident in printer controller 58, mail finishing unit controller 100, and motion controllers 104-1, 104-2 and 104-3. It should be noted that the partitioning of these modules among the various controllers forms no part of the subject invention as claimed and that, in principle, all the functions of apparatus 4 could be controlled by a single controller of sufficient capacity.

Job data 10 is input from host computer 2 to host interface 110, which is resident in printer controller 58. Interface 110 is preferably a standard interface for managing a serial protocol such as the RS 232 protocol, or a standard parallel or network protocol. Job data 10 is then transferred to parser 112 which outputs document data from field 20 to page description language (PDL) interpreter 114 and envelope data from field 22 to envelope data buffer 118 in mail finishing unit controller 100. Parser 112 also outputs mail finishing unit control data, which is default attribute data from job header 12 or specific mail piece attribute data from mail piece header 18, and the EOJ to mail piece attribute generator 116.

Mail piece attribute generator 116 receives the mail finishing unit control data which is expressed as codes descriptive of a mail piece; (e.g. codes which would describe a mail piece having 1 printed page, a preprinted insert, no BRE, which is to be sealed) and converts these descriptive codes into commands for the operation of the various stations and printers in mail finishing unit 64. Default commands are stored permanently for the duration of a job while commands found in mail piece header 18 are stored only for the production of a corresponding mail piece. Preferably common information for printing the envelopes is transferred to the integral controller of envelope printer 66. Mail piece attribute generator 116 also responds to the EOJ code to identify the last mail piece to assure that the mailing job is properly terminated and the last mail piece completed.

Returning to interpreter 114, the document data, which is expressed in a conventional page description language such as PCL5 is interpreted at 114 in a conventional manner into an appropriate set of printer commands to drive the print engine used. As each page is translated it is stored in page buffer 122. Such interpretation and buffering of document pages is conventional in the laser printing art and need not be described further here for an understanding of the subject invention except to note that buffer 122 is substantially larger than is normally found in a commercial laser printer for office use since it is desirable that pages be stored until a mail piece is output from apparatus 4 to facilitate recovery from jam conditions.

Once the first envelope is available data is transferred from page buffer 122 to print engine driver 124 which renders the print commands into appropriate control signals to generate an image of the page at document printer engine 60.

Also as each page is interpreted interpreter 114 transmits a page token to mail piece production monitor/controller 120 which is resident in mail finishing unit controller 100. Monitor/controller 120 updates these tokens as pages move through mail finishing unit 64 to track the pages and to facilitate recovery from jam conditions.

When monitor/controller 120 detects the presence of envelope data in buffer 118 it transfers the envelope data to envelope print driver 119 which controls envelope printer 66 to print the envelope data on the envelope in accordance with the previously determined attribute data defining the common elements of the envelope address and, for mail pieces to be franked, the variable portions of the indicia which have been determined by attribute generator 116 as will be described more fully below. It should be noted that, since envelope printer 66 includes an integral controller, driver 119 is substantially simpler than driver 124. And, as with print engine driver 124, the control of envelope printer 66, which is preferably an ink jet printer, is conventional and need not be described further here for an understanding of the subject invention except to note that buffer 118 is also somewhat larger than normal so that envelope data may also be recovered in the case of a jam.

Mail piece production monitor/controller 120 will then continue to print envelope data from buffer 118 as it is available until drying buffer 68 is loaded; that is until buffer 68 is completely full or an EOJ code is detected and monitor/controller 120 recognizes that the last envelope is in drying buffer 68. Then, when drying buffer 68 is loaded monitor/controller 120 signals page buffer 122 to release the next page to engine driver 124, and when document printer engine 60 is ready signals driver 124 to print the page. If multiple pages of documents are to be included in a mail piece, as defined by the mail piece attributes generated at 116, monitor/controller 120 continues to release pages from buffer 122 until all pages for a mail piece are printed.

Once monitor/controller 120 has released the last page for a mail piece it determines if the EOJ code has been detected and the last envelope is in drying buffer 68. If not the next envelope data in buffer 118 is printed and drying buffer 68 is advanced and pages for the next document are released from buffer 122, as described above. Once the EOJ code is detected and monitor/controller 120 recognizes that the last envelope has been printed and is in drying buffer 68 monitor controller 120 will cease printing envelopes but will continue to release pages from page buffer 122 until the last envelope is fed from drying buffer 68 to inserter station 82 so that the last mail piece in a mailing job is properly processed through mail finishing unit 64.

As pages are released from document printer engine 60 they are processed through mail finishing unit 64 as described above. Monitor/controller 120 accesses the mail piece attributes generated at 116 and issues appropriate commands to motion controllers 104-1, 104-2 and 104-3 to control the various stations appropriately to produce mail pieces having the desired attribute. These commands are received by motion control software 130-1, 13-2 and 130-3, which are resident in corresponding motion controllers while 104-1, 104-2 and 104-3 and which generate appropriate control signals for various motors and actuators in mail finishing unit 64 and which monitor various sensors in unit 64 to produce a mail pieces having the desired attributes. Detailed design of the motion controllers and associated software will depend in general on the detailed design of the various stations of mail finishing unit 64 but is well within the skill of a person of ordinary skill in the digital control arts as they are applied to the mail processing art. A particularly suitable form of motion controller wherein identical motion control software can be adapted to various stations by downloading of appropriate data is described in commonly assigned, co-pending U.S. patent application Ser. No. 08/327,246; filed Sep. 29, 1994 which is hereby incorporated by reference.

In the preferred embodiment shown, motion control software 130-1 controls accumulator station 78, folder station 80, inserter station 82, drying buffer 68 and flap opener 72; motion control software 130-2 controls accelerator 76, insert feeder 96 and BRE feeder 98; and motion control software 130-3 controls moistener 84, flap closer 86, sealer station 90 and stacker 94. In general this partitioning of control functions is chosen to simplify wiring of mail finishing unit 64 and to minimize the need for time critical transfers of information between controllers, and forms no part of the subject invention as claimed.

Figure 7:
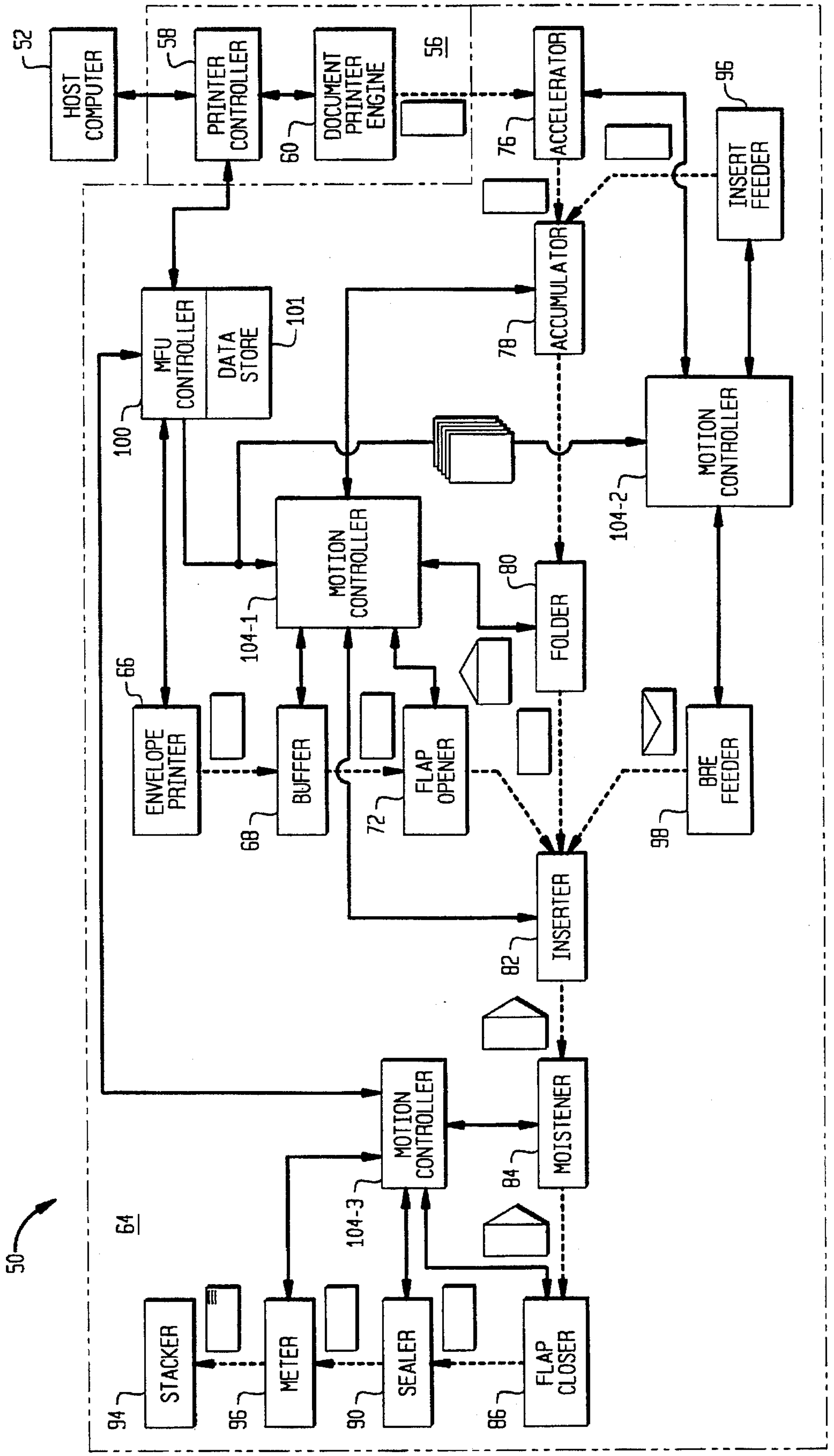
FIG. 7 is a schematic block diagram of the flow of mail production apparatus used in another embodiment of the system of FIG. 1.
Figure 8:
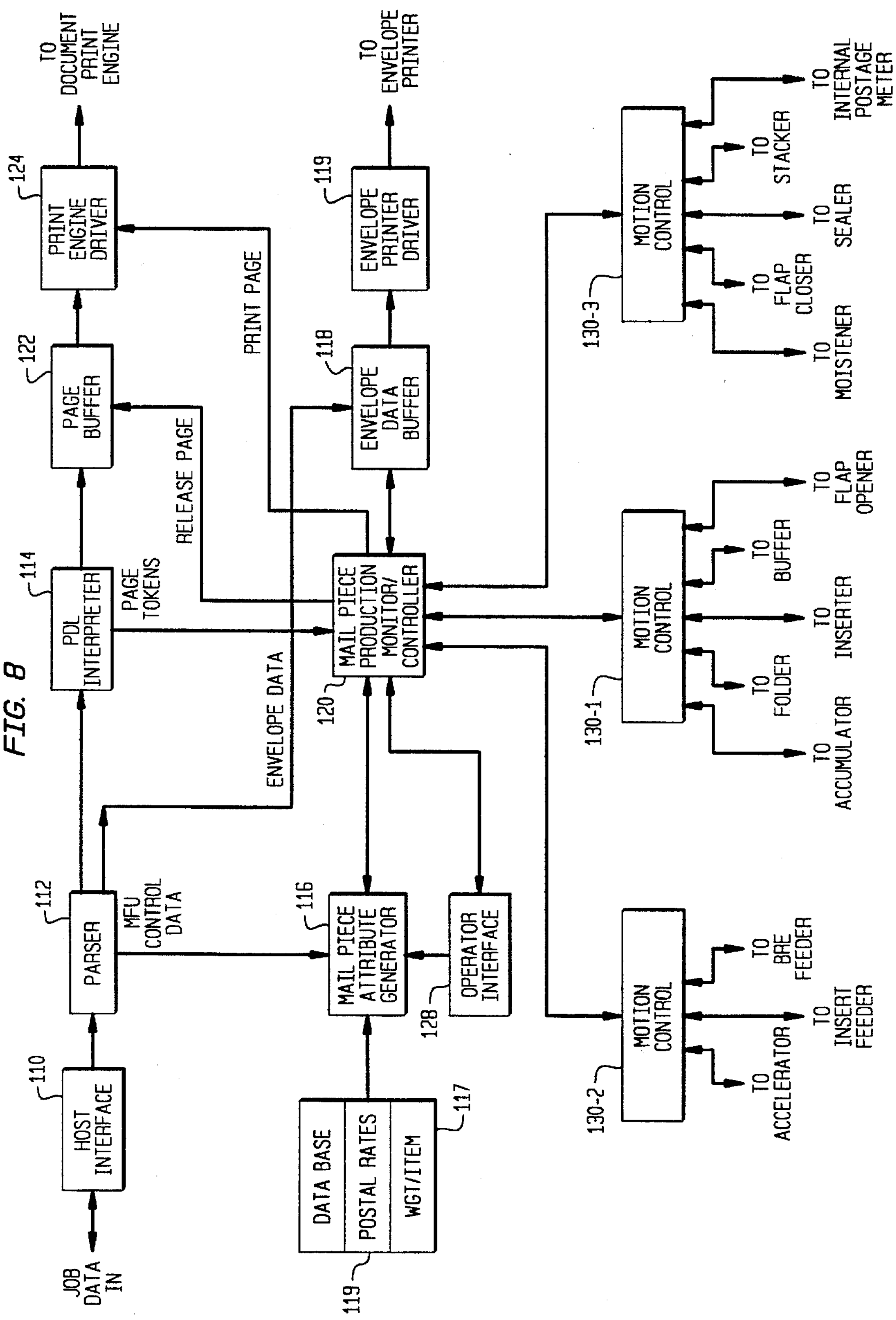
FIG. 8 is a schematic representation of the flow of control data in the apparatus FIG. 7.

Turning to FIGS. 7 and 8, another embodiment of the subject invention is shown. In this embodiment mail pieces are produced essentially in the same manner as described above except that mail pieces are franked by substantially conventional postage meter 96 which is incorporated in mail finishing unit 4 between sealer 90 and stacker 94. As a mail piece to be franked is processed through sealer 90 motion controller 104-3 sets meter 96 in a conventional manner to print a postal indicia of the proper value. In FIG. 8, attribute generator 116 determines the postage value in the same manner as described with regard to FIG. 6, as will be described below. However, instead of requesting the variable portion of an indicia from a class 2 meter for printing by envelope printer 66, the postage value is transferred to monitor/controller 120. when motion control 130-3 signals that the corresponding mail piece is being processed by sealer 90 controller 120 down loads the appropriate postage value to be set into meter 96 by motion controller 104-3. Meter 96 then imprints the mail piece with a conventional letterpress indicia and outputs the mail piece to stacker 94.

In either embodiment described above, an error condition can occur if the meter funds are exhausted before the job is completed. The system can respond to such errors by halting until the meter can be recharged in a conventional manner, or by completing the job without franking and alerting an operator that part of the job must be franked off-line, or in any other convenient manner.

Figure 9:
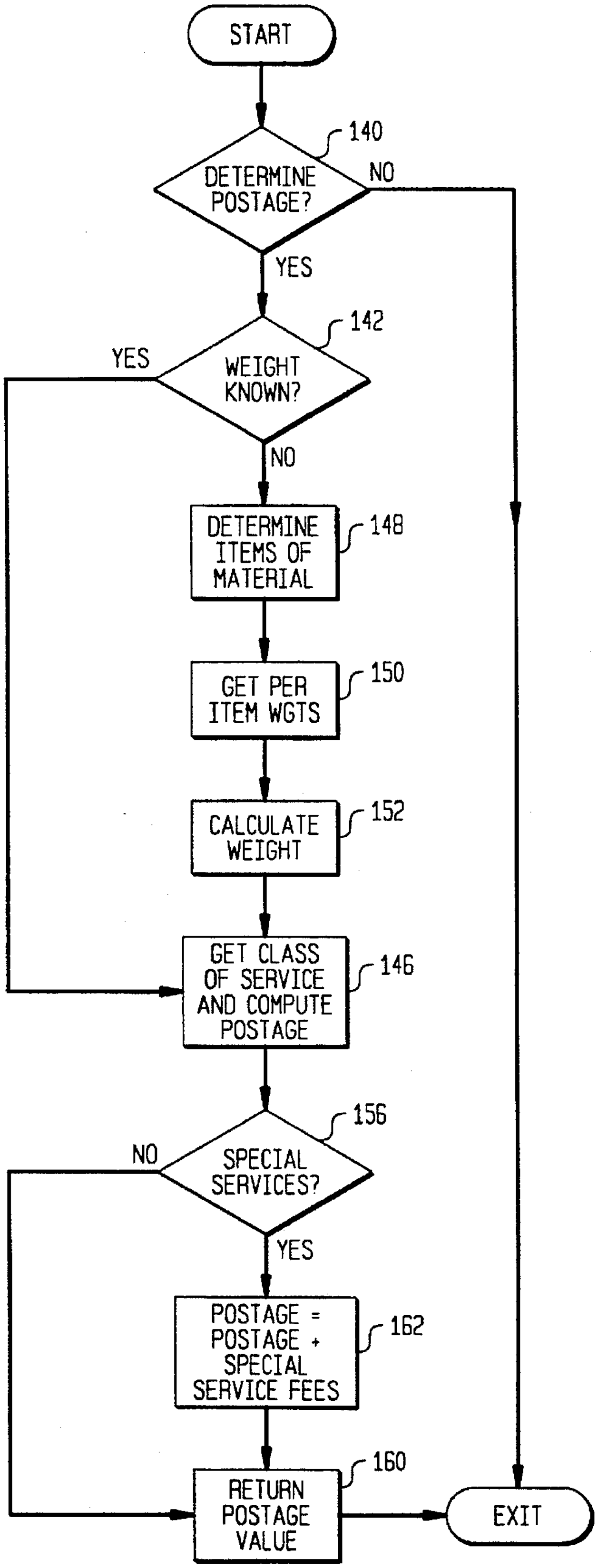
FIG. 9 is a flow diagram of the operation of the apparatus of FIGS. 5 and 7 in determining postage for a mail piece.

FIG. 9 shows a schematic flow diagram of the calculation executed by attribute generator 116 in determining a postage value for a mail piece to be franked.

At 140 generator 116 tests the data received from parser 112 to determine if the mail piece is to be franked. If the answer is no then generator 116 exits the calculation. Otherwise at 142 it tests to determine if the weight is known and included in the data. If the weight has been previously defined as part of the mail piece attributes, then generator 116 goes to 146 to determine the class of service defined in the attributes.

If no weight is defined for the mail piece, at 148, generator 116 determines the number of sheets in the document and other items of material included in the mail piece from the attribute data. Generator 116 then, at 150, accesses data store 101 to get per item weights from data base 117 and totals the per item weights for all items in the mail piece, at 152, to calculate the weight and goes to 146.

At 146 generator 116 determines the class of service defined in the mail piece attributes and accesses data base 119 in data store 101 to get postage rate data and calculate postage for the mail piece. Then at 156 generator 116 tests the attribute data to determine if there are any special fees applicable to the mail piece. (e.g. certified mail) If there are no special fees generator 116 goes to 160.

If special fees apply the at 162 the fees are determined from data base 119 and added to the postage.

Calculation of postage from the weight and class of service and the any special services applicable is well known and need not be described further here for an understanding of the subject invention.

At 160 generator 116 returns the postage value to be used to frank the mail piece and exits the postage calculation.

While in the preferred embodiment described above postage values are calculated based upon the weight of a mail piece, other embodiments, which provide for rate calculation based on any characteristic (hereinafter "rating characteristic") of a mail piece upon which a postal service may chose to base rates (e.g. envelope size or width), are well within the ability of those skilled in the art and are considered to be within the scope of the subject invention.

The above description of preferred embodiments of the subject invention has been given by way of illustration only, and numerous other embodiments of the subject invention will be apparent to those skilled in the art from consideration of the above description and the attached drawings. Particularly, other forms of mail finishing apparatus such as that described in above referenced U.S. Pat. No. 5,067,305 are within the contemplation of the subject invention. Accordingly limitations on the scope of the subject invention are to found only in the claims set forth below.

What is claimed is:

1. An apparatus for producing a mailpiece, said apparatus comprising:

a) a first printer for printing a document in accordance with mailpiece attribute data;

b) mail finishing means for receiving said document from said printer and inserting said document into an envelope to form said mailpiece, said mail finishing means including means for franking said mailpiece;

c) control means responsive to a digital signal representative of mailpiece weight and size for controlling said apparatus to produce said mailpiece in accordance with said mailpiece data, said mailpiece data including document data defining said document; wherein d) said control means is further for controlling said franking means, and said control means includes a data store for storing:

d1) a first data base of per item rating characteristics for materials to be used to form said mailpiece d2) a second data base of postage rates; and wherein further, e) said controller is responsive to said digital signal to calculate a rating characteristic for said mailpiece as a function of said per item rating characteristics and to calculate a postage amount for said mailpiece as a function of said rating characteristic and said postage rates, and to control said franking means to frank said mailpiece with said postage amount.

2. An apparatus as described in claim 1 wherein said materials include sheets and envelopes and said rating characteristic is weight of said mail piece.

3. An apparatus as described in claim 1 wherein said document data includes graphic data representative of at least a partial image of said document.

4. An apparatus as described in claim 1 wherein said mail finishing means includes a second printer for printing an address on an envelope.

5. An apparatus as described in claim 4 wherein said franking means comprises said second printer.

6. An apparatus as described in claim 5 wherein said apparatus communicates with a class 2 postage meter, said meter returning at least a variable portion of a postage indicia to be printed on said envelope by said second printer and accounting for postage expended by said apparatus.

7. An apparatus as described in claim 5 wherein said second printer prints said postage amount on said envelope as a scannable representation.

8. An apparatus as described in claim 1 wherein said franking means comprises a conventional postage meter.

9. An apparatus as described in claim 1 wherein said franking means prints said postage amount on said envelope as a scannable representation.

10. An system for producing a mailpiece, said system comprising:

a) data processing means for:

a1) generating document data depending on weight and size of a document in said mailpiece;

a2) appending attribute data to said document data to form mailpiece data depending on weight and size of a said mailpiece; and, a3) transmitting a digital signal representative of said mailpiece depending on the weight and size of said mailpiece to an apparatus for producing said mailpiece;

wherein said apparatus comprises;

b) a first printer for printing a document in accordance with mailpiece attribute data;

c) mail finishing means for receiving said document from said printer and combining said document with an envelope to form said mailpiece, said mail finishing means including means for franking said mailpiece;

d) controlling means responsive to said digital signal for controlling said apparatus to produce said mailpiece in accordance with said mailpiece weight and size, said mailpiece data including document data defining said document; wherein, e) said control means is further for controlling said franking means, and said control means includes a data store for storing:

e1) a first data base of per item rating characteristics for materials to be used to form said mailpiece;

e2) a second data base of postage rates; and wherein further, f) said controller is responsive to said digital signal to calculate a rating characteristic for said mailpiece as a function of said per item rating characteristics and to determine a postage amount for said mailpiece as a function of said rating characteristic and said postage rates, and to control said franking means to frank said mailpiece with said postage amount.

11. A system as described in claim 10 wherein said materials include sheets and envelopes and said rating characteristic is weight of said mail piece.

12. A system as described in claim 10 wherein said document data includes graphic data representative of at least a portion of an image of said document.

13. A system as described in claim 10 wherein said mail finishing means includes a second printer for printing an address on said envelope.

14. A system as described in claim 13 wherein said franking means comprises said second printer.

15. A system as described in claim 14 wherein said apparatus communicates with a class 2 postage meter, said meter returning at least a variable portion of a postage indicia to be printed on said envelope by said second printer and accounting for postage expended by said apparatus.

16. A system as described in claim 14 wherein said second printer prints said postage amount on said envelope as a scannable representation.

17. A system as described in claim 10 wherein said franking means comprises a conventional postage meter.

18. A system as described in claim 10 wherein said franking means prints said postage amount on said envelope as a scannable representation.

* * * * *